United States Patent [19]

Obara

[11] Patent Number: 4,736,086

[45] Date of Patent: Apr. 5, 1988

[54] TAPER CUTTING CONTROL UNIT FOR WIRE-CUT, ELECTRIC DISCHARGE MACHINE

[75] Inventor: Haruki Obara, Sagamihara, Japan

[73] Assignee: Fanuc Ltd, Minamitsuru, Japan

[21] Appl. No.: 919,004

[22] PCT Filed: Feb. 7, 1986

[86] PCT No.: PCT/JP86/00054

§ 371 Date: Oct. 6, 1986

§ 102(e) Date: Oct. 6, 1986

[87] PCT Pub. No.: WO86/04532

PCT Pub. Date: Aug. 14, 1986

[30] Foreign Application Priority Data

Feb. 9, 1985 [JP] Japan ............... 60-24189

[51] Int. Cl.[4] ............... B23H 7/06
[52] U.S. Cl. ............... 219/69 W; 318/570
[58] Field of Search ............ 219/69 W; 318/570, 572, 318/573, 603; 364/475

[56] References Cited

U.S. PATENT DOCUMENTS

| | | | |
|---|---|---|---|
| 4,467,166 | 8/1984 | Gamo et al. ............ | 219/69 W |
| 4,559,601 | 12/1985 | Kishi et al. ............ | 219/69 W |
| 4,572,998 | 2/1986 | Nozawa et al. ............ | 318/572 |
| 4,648,024 | 3/1987 | Kato et al. ............ | 318/570 |

FOREIGN PATENT DOCUMENTS

| | | | |
|---|---|---|---|
| 106994 | 8/1979 | Japan ............ | 219/69 W |
| 500405 | 4/1981 | Japan . | |
| 58-28424 | 2/1983 | Japan ............ | 219/69 W |
| 59-34923 | 6/1984 | Japan . | |

Primary Examiner—A. D. Pellinen
Assistant Examiner—Geoffrey S. Evans
Attorney, Agent, or Firm—Staas & Halsey

[57] ABSTRACT

The present invention is intended to improve the accuracy of taper cutting by a wire-cut, electric discharge machine. Path data and parameters necessary for taper cutting are punched in a paper tape (PTP). The path data read out by a tape reader (TR) is decoded by a decoder (DEC) and then provided to a register (REG). The parameters for taper cutting are decoded by the decoder and then applied to a correction circuit (CPS). The correction circuit (CPS) corrects the parameters on the basis of the sum $(\delta_1+\delta_2)$ of a first deviation $(\delta_1)$ of the wire electrode supporting point on each guide which is caused by a curved configuration of its guideway and a second deviation $(\delta_2)$ of the supporting point which is caused by the fact that the wire electrodes does not exactly conform to the geometrical configuration of the guideway. The second deviation corrects for the elasticity of the wire. The parameters thus corrected are provided to a register (PAR). A processing unit (WCP) effects known taper cutting control according to the stored data of the registers (REG, PAR).

2 Claims, 9 Drawing Sheets

TAPER CUTTING CONTROL UNIT FOR WIRE-CUT, ELECTRIC DISCHARGE MACHINE

BACKGROUND OF THE INVENTION

The present invention relates to a taper cutting control unit for a wire-cut, electric discharge machine.

As is well-known in the art, a wire-cut, electric discharge machine has a wire electrode (hereinafter referred to simply as a wire) stretched in a taut condition between upper and lower guides and cuts a workpiece by a discharge which is produced between the wire and the workpiece. The workpiece is fixedly mounted on a table and shifted along a desired shape in the X and Y directions in response to commands from a numerical controller. In this instance, when the wire is stretched in a direction perpendicular to the table (or the workpiece), the workpiece is cut into a required profile whose top and bottom surfaces have the same shape. When the upper guide is adapted to be displaceable in the X and Y directions and is displaced in a direction perpendicular to the direction of travel of the workpiece so that the wire is held at an angle thereto for an angular cut, so-called taper cutting takes place by which the workpiece is cut into a required profile with top and bottom surfaces of different shapes.

FIG. 8 is a schematic diagram showing the general arrangement of such a four-axis control wire-cut, electric discharge machine, in which a workpiece WK is fixedly mounted on an X-Y table TB which is driven by motors MX and MY in the X and Y directions. On the other hand, a wire WR is paid out of a reel RL1 and wound onto a reel RL2 while being stretched between lower and upper guides DG and UG, and a voltage is applied from a contact electrode, not shown, to the wire, producing a discharge between it and the workpiece WR. The upper guide UG is provided on a column CM in a manner to be movable by motors MU and MV in the X and Y directions, respectively, and the motors MX, MY, MU and MV are driven by servo control circuits DVX, DVY, DVU and DVV of a numerical controller NC. When the contents of a command tape TP are read, processing for distributing pulses to each axis is performed by a distribution circuit DS. With such a wire-cut, electric discharge machine, taper cutting of the workpiece WK can be achieved by displacing the upper guide UG in the X and Y directions so that the wire WR is tilted with respect to the workpiece WK.

FIG. 9 is a diagram explanatory of such taper cutting. The wire WR is shown to be stretched between the upper and lower guides UG and DG at a predetermined angle to the workpiece WK. Now, assuming that a shape, into which the bottom surface PL of the workpiece WK is to be cut, is programmed (The shape into which the top surface QU of the workpiece WK is cut may also be programmed), and letting the angle of taper be represented by $\theta_0$, the distance between the upper and lower guides UG and DG by H, and the distance between the lower guide DG and the bottom surface of the workpiece WK by h, the amounts of offset $d_1$ and $d_2$ of the lower and upper guides DG and UG from the bottom surface PL of the workpiece WK can be expressed as follows:

$$d_1 = (h \cdot \tan \theta_0) + d/2 \quad (1)$$

$$d_2 = (H \cdot \tan \theta_0) - (h \cdot \tan \theta_0) - d/2 = (H \cdot \tan \theta_0) - d_1 \quad (2)$$

where d is the width of a groove being cut in the workpiece.

Accordingly, when the movement of the upper guide UG around which the wire WR is directed is controlled as the workpiece is moved so that the amounts of offset $d_1$ and $d_2$ remain constant, the workpiece can be tapered at the angle $\theta_0$, as depicted in FIG. 10. In FIG. 10, the broken line and the one-dot chain line indicate paths of the upper and lower guides UG and DG, respectively. During taper cutting, commands are usually issued on the programmed path on the bottom or top surface of the workpiece, the feed rate along the programmed path, the tapering angle $\theta_0$, the afore-mentioned distances H and h, etc., thereby performing the cutting as instructed.

Incidentally, the wire-cut, electric discharge machine usually employs a circularly-bored die for taper cutting. FIG. 11 shows in section such circularly-bored dies which are utilized as the upper and lower guides UG and DG. In FIG. 11, reference character CH indicates a circular bore of the die, NSU a bottleneck portion of the upper guide UG, and NSD a bottleneck portion of the lower guide DG. The bottleneck portion of each guide is formed at an acute angle or slightly rounded. In the electric discharge machine using such circularly-bored dies as the upper and lower guides, the amount of travel of the upper guide UG relative to the workpiece is determined regarding the centers of the bottleneck portions NSU and NSD (indicated by black circles) as wire supporting points the positions of which determine the tapering angle, and the movement of the upper guide is controlled accordingly. That is, the amount of relative travel of the upper guide UG is calculated on the basis of the tapering angle $\theta_0$ which is an angle between a straight line joining the both supporting points and the workpiece, the vertical distance H between both supporting points, and the distance h between the wire supporting point in the lower guide DG and the bottom surface of the workpiece, and the movement of the upper guide is controlled in accordance with the amount of its relative travel thus obtained.

In the case where the bottleneck portions NSU and NSD of the circularly-bored dies are formed acute or slightly rounded, since the wire has a predetermined diameter and a certain flexural rigidity, an increase in the tapering angle $\theta_0$ causes the trajectory of the wire center to become as indicated by the broken line in FIG. 11, and so the wire no longer retains the angle $\theta_0$. Furthermore, since the wire abruptly bends, its trajectory varies during running, resulting in a failure of high precision cutting.

In view of the above, the present inventor has previously proposed the following system which keeps the tapering angle as instructed and prevents the wire from shifting its position while in operation (see Japanese Pat. Pub. Disc. No. 28424/83, for example).

FIG. 12 is a sectional view for explaining wire guides for taper cutting by the electric discharge machine according to the above-said proposal. In FIG. 12, reference character WR identifies a wire, UG an upper guide, and DG a lower guide. A workpiece is disposed between the upper and lower guides UG and DG, though not shown. Those portions UGW, UGW' (the upper guide) and DGW, DGW' (the lower guide) of the upper and lower guides UG and DG along which the wire is guided on the side where the workpiece is disposed are each curved, in section, along an arc of a circle with a radius R, and those portions UGU and DGU of the guides which are on the side opposite from the workpiece are conically-sectioned. That is, both the oncoming side of the upper guide UG and the offrunning side of the lower guide DG are of circular (spherical) cross section with the radius $R_0$. It is desirable that the value of the radius $R_0$ be three times, preferably, five times or more larger than the wire diameter. With the inlet and outlet portions of the guides thus rounded in section along a circular arc with the radius $R_0$, there is no longer posed the problem which arises from the bending of the wire $WR_0$ as in the case of using the circularly-bored dies. In other words, the wire WR is smoothly guided through the dies and becomes less slack, so that it is possible to reduce the variations in the trajactory of the wire and the variations in the tapering angle owing to the rigidity of the wire.

With the guides of the structure depicted in FIG. 12, the essential wire supporting points shift to points A and A' respectively. The points A and A' are each the intersection of the vertical portion WRn of the wire WR with the center line of the taper cutting portion WRt. During programming the programmed path, the distances H and h, and the tapering angle $\theta_0$ are commanded on the assumption that the wire is supported at points C and C'. Accordingly, during actual cutting the commanded or other data must be corrected on the basis of the tapering angle $\theta_0$; this correction is effected in such a manner as follows:

Now, letting the diameter of the wire WR be represented by $\phi$, the distance $\delta_1$ between the essential wire supporting points A, A' and the wire supporting points C, C' on the program is given by $$\delta_1 = (R_0 + \phi/2) \cdot \tan(\theta_0/2) \quad (3)$$

and the essential wire supporting points A and A' approach each other in the vertical direction. Namely, the vertical distance Hc and the horizontal distance Dc between the essential supporting points A and A' are expressed by the following equations:

$$Hc = H - 2(R_0 + \phi/2) \cdot \tan(\theta_0/2) \quad (4)$$

$$Dc = Hc \tan \theta_0 = \{H - 2(R_0 + \phi/2) \cdot \tan(\theta_0/2)\} \cdot \tan \theta_0 \quad (5)$$

Accordingly, the following methods can be employed for the correction:

[A] Noting the vertical distance between the supporting points, the distance Hc is obtained from Eq. (4), and taper cutting is controlled in accordance with the distance Hc.

[B] Noting the horizontal distance between the supporting points, the distances of travel of the upper and lower guides are corrected on the basis of Eq. (5), without correcting the distance H. That is, the lower and upper guides DG and UG are moved to the left and to the right, respectively, by the following distance:

$$(R_0 + \phi/2) \cdot \tan(\theta_0/2) \cdot \tan \theta_0 \quad (6)$$

However, the present inventor's experiments revealed that sufficient accuracy of taper cutting could not be obtained with such a correction alone.

As shown in FIG. 13, a 0.2 mm diameter wire was used as the wire WR, and a guide whose guideway had a 5 mm radius of curvature and had a minimum clearance of around 10 μm between it and the wire was used as the guide GW. When taper cutting was actually performed for various tapering angles while applying a tensile force of 700 g to the wire WR, the actual tapering angles differed from commanded ones. The deviation $\delta$ of the supporting point of the wire WR, counted back from each actual tapering angle, was such as indicated by the solid line 1 in FIG. 14, from which it is seen that the above deviation differed relatively largely from the deviation $\delta_1$ (indicated by the broken line 2 in FIG. 14) obtained from Eq. (3).

SUMMARY OF THE INVENTION

The present invention has been made in view of the above, and has for its object to further improve the taper cutting accuracy.

The present invention permits high precision taper cutting by providing, in the taper cutting control unit for a wire-cut, electric discharge machine, correcting means which electrically corrects, in accordance with the tapering angle, an error of the inclination angle of the wire electrode based upon the sum of a first deviation of the supporting point of the wire electrode which is caused by the curved configuration of the guideway of the guide and a second deviation of the wire supporting point which is due to the fact that the wire electrode does not exactly follow the geometrical configuration of the guideway on account of the elasticity of the wire electrode.

DESCRIPTION OF THE PREFERRED EMBODIMENT

A description will be given first of the principles of the present invention.

Figure 12:
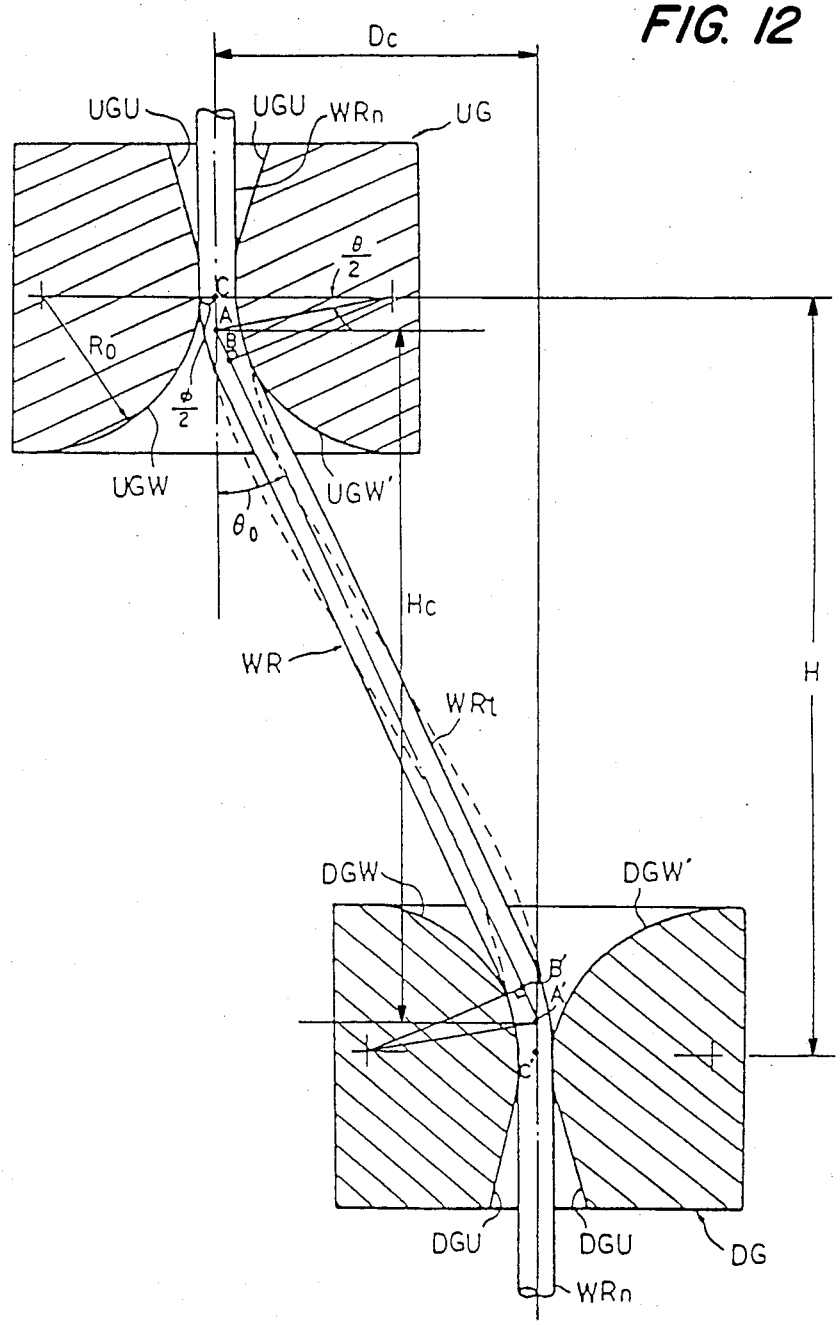

What can be seen from the afore-mentioned experiments is that the actual inclination of the straight portion of the wire WR between the upper and lower guides UG and DG, indicated by the broken line in FIG. 12, is greater than the inclination indicated by the solid line. In this instance, it is believed that since the wire WR passes through the bottleneck portions of the upper and lower guides UG and DG at the same position, the wire WR does not exactly conform to the geometrical configuration of the guideway of each of the upper and lower guides UG and DG but slightly deviates therefrom, causing an increase in the inclination of the straight portion of the wire WR.

Figure 2:
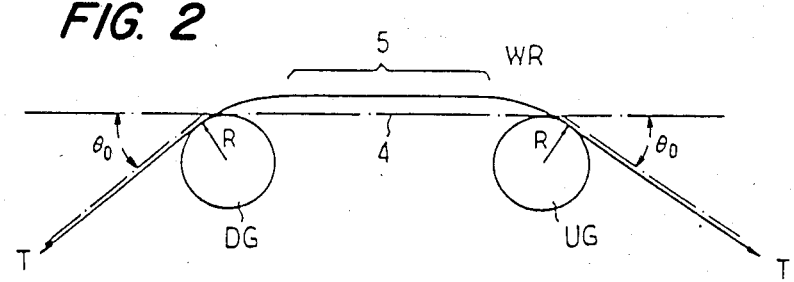
FIGS. 2, 3, 4 and 5 are diagrams for explaining the principles of the present invention.

In view of the above, the present inventor studied the curvature of the wire WR, assuming such a model as shown in FIG. 2. In FIG. 2, reference characters UG and DG indicate circular upper and lower guides with a radius R (In fact, the radius of each guide is $R_0$ and the radius of the wire exists, as $R=R_0+\phi/2$; but these factors are omitted for the sake of brevity.), WR a wire, and $\theta_0$ the angle between a line (a one-dot chain line 4) tangential to the upper and lower guides UG and DG and the direction in which the wire WR is pulled. Furthermore, the following conditions were assumed:

(1) The wire WR is an elastic member.
(2) The guides are circular.
(3) The span between the guides is sufficiently wide.
(4) The ends of the wire are pulled at sufficiently distant positions.
(5) When the contact angle between the guide and the wire is small, the wire makes point contact with the guide, and when the contact angle increases and the radius of curvature of the wire at the point of contact with the guide becomes smaller than the radius R of the guide, the wire is directed around the guide. Even if the contact angle is further increased and the wire is directed around a wider portion of the guide, this state will not differ from the state at the instant when the radius of curvature of the wire is equal to the radius of the guide.

Figure 3:
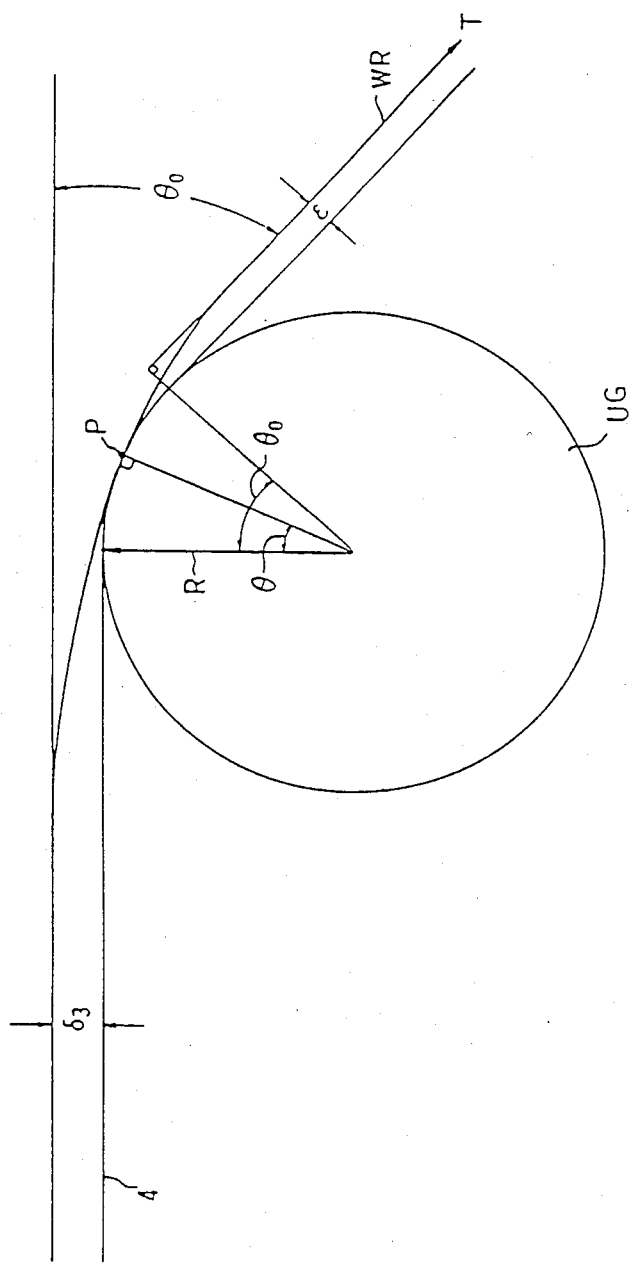

FIG. 3 is an enlarged diagram of the right half of FIG. 2, showing the state in which the wire WR does not exactly conform to the geometrical configuration of the upper guide UG, owing to the elasticity of the wire; on the side toward the lower guide DG, the wire deviates, by $\delta_3$, from the line 4 tangential to the both guides and deviates therefrom by $\epsilon$ on the opposite side. Incidentally, $\theta$ indicates the angle between perpendicular lines from the center of the upper guide UG to the wire WR and the line 4. The angle between a perpendicular line from the center of the guide to a line parallel to the direction in which the wire WR is pulled and the perpendicular line to the line 4 is equal to $\theta_0$.

By setting up an equation from an equilibrium equation of force at a point P to obtain the deviation $\delta_3$ halfway between the upper and lower guides UG and DG in the model system shown in FIG. 3, the following equations can be obtained approximately.

When the angle $\theta_0$ is smaller than a value $\theta_0'$ dependent upon $\tan(\theta_0'/2)=1/kR$, $$\delta_3 = \tan(\theta_0/2)/k - R\{1-\cos(\theta_0/2)\} \quad (7)$$

When the angle $\theta_0$ is larger than the value $\theta_0'$, it follows from the assumption (5) that $$\delta_0 = (1/k^2R) - R\{1-\cos(\theta_0'/2)\} \quad (8)$$

In the above, $k^2=T/I_zE$ (where T is the tensile force of the wire, $I_z$ the geometrical moment of inertia of the wire WR, and E the Young's modulus of the wire WR) and $\theta_0'$ is a critical value for the wire WR to be directed around the guide. This value can be obtained by solving an equation $$d^2y/dx^2 = -1/R \quad (9)$$

where y and x are the coordinates of the contact point P in directions perpendicular and horizontal to the line 4, respectively.

According to calculations, the wire WR abruptly bends near the guide and then travels along a substantially straight path (as indicated by 5 in FIG. 2).

Figure 4:
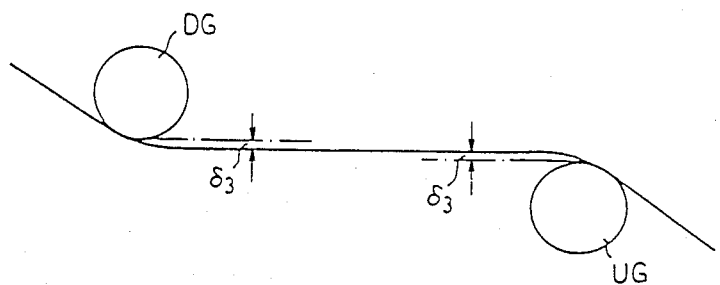

Also in the case where the upper and lower guides UG and DG are disposed in such a manner as to support the wire WR from opposite directions, as depicted in FIG. 4, the deviation $\delta_3$ of the wire is substantially equal to that in the above case. This is because of the fact that the influence of the direction in which the wire is supported diminishes as the distance from the guide increases.

Figure 5:
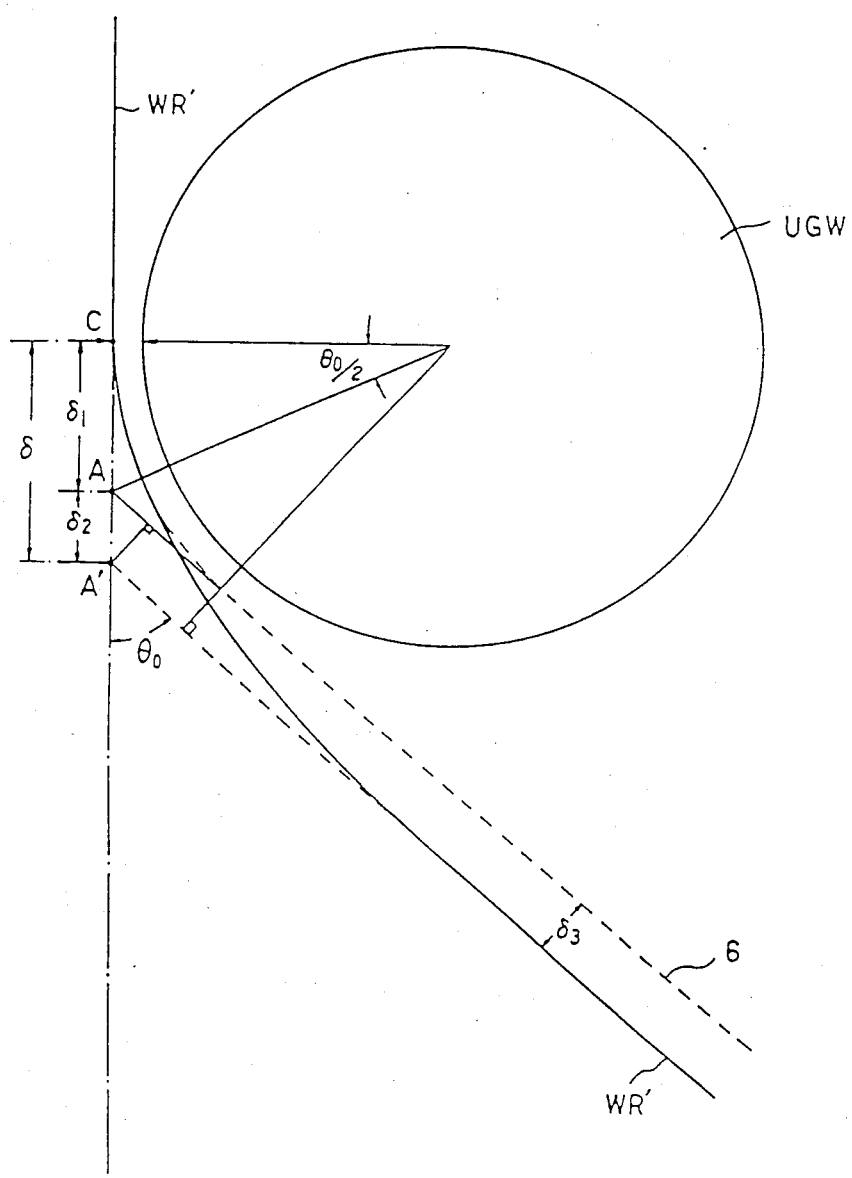

FIG. 5 shows an application of the above discussion to taper cutting.

When the wire WR is pulled from a direction at an angle $\theta_0$ to a perpendicular line (perpendicular to the underside of the wire), if the elasticity of the wire WR were ignored, its center line WR' would be in agreement with the broken line 6 exactly following the geometrical configuration of the upper guide UG. In practice, however, the wire bends owing to its elasticity and its center line deviates from the broken line 6 by $\delta_3$, as indicated by the solid line. In consequence, the supporting point of the wire WR shifts from the point C to a point A' by $\delta$. The value of this deviation $\delta$ is the sum of the (first) deviation $\delta_1$ which is attributable to the circular configuration of the guideway, as referred to previously with regard to FIG. 12, and the (second) deviation $\delta_2$ which arises from the deviation $\delta_3$ of the wire WR which does not exactly conform to the shape of the guideway due to its elasticity. The first deviation $\delta_1$ can be obtained from Eq. (3) and the second deviation $\delta_2$ from the following equation:

$$\delta_2 = \delta_3/\sin\theta_0 \quad (10)$$

Since the overall deviation $\delta$ is thus obtained, high precision taper cutting can be achieved by calculating and correcting the position of the guide in accordance with the tapering angle $\theta_0$ during cutting.

Figure 14:
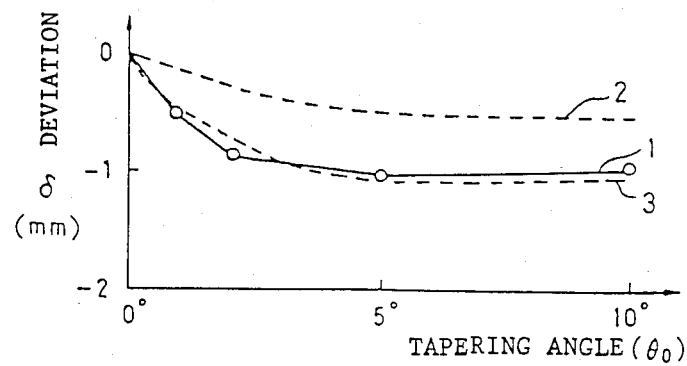
FIG. 14 is a graph showing an example of the experimental results.

The broken line 3 in FIG. 14 shows the results of calculation of the deviation $(\delta_1+\delta_2)$ taking into account the above Eq. (10) as well, and this deviation substantially agrees with the deviation obtained from the experimental results, indicated by the solid line 1.

The present invention is based upon such principles as mentioned above and is applied to a taper cutting control unit for a wire-cut, electric discharge machine in which a wire is stretched between a pair of guides, each having a curved guideway on the side where a workpiece is disposed, and the wire is held at an angle to the workpiece and displaced relative thereto for taper cutting. According to the present invention, there is provided correcting means for electrically correcting, in accordance with the tapering angle, an error in the inclination angle of the wire which is based on the sum of the first deviation $\delta_1$ of the wire supporting point, which is attributable to the curved surface of the guideway, and the second deviation $\delta_2$ of the wire supporting point which is caused by the fact that the wire does not exactly conform to the geometrical configuration of the guideway on account of the elasticity of the wire itself.

Figure 1:
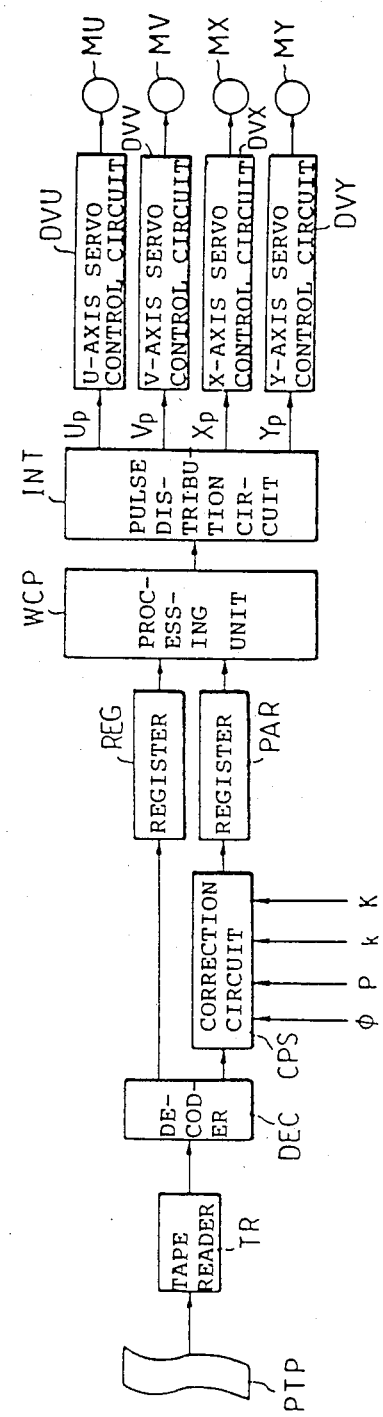
FIG. 1 is a block diagram illustrating the principal part of an embodiment of the present invention.

FIG. 1 is a block diagram illustrating the principal part of an example of the numerical control unit of the present invention which conducts electric discharge machining while correcting the vertical distance between the supporting points of the wire. In FIG. 1, reference character PTP indicates a paper tape having numerical control information punched therein, TR a tape reader for reading the information punched in the paper tape, DEC a decoder for decoding the information read out of the paper tape PTP, REG a register, and PAR a parameter storage register for storing the tapering angle $\theta_0$, the distance H between the upper and lower guides, the distance h between the underside of the workpiece and the lower guide, etc. Reference character CPS identifies a correction circuit for correcting the distances H and h. The vertical distance between the wire supporting points is corrected on the basis of the following equation:

$$Hc = H - 2(\delta_1 + \delta_2) \quad (11)$$

The distance h between the underside of the workpiece and the lower guide is corrected on the basis of the following equation:

$$hc = h - (\delta_1 + \delta_2) \quad (12)$$

Reference character WCP designates a known processing unit which controls wire-cut, electric discharge machining and which inputs position data and parameters such as the tapering angle $\theta_0$, the distances H and h, and so forth, and calculates and outputs incremental amounts of travel ($\Delta X$, $\Delta Y$) of the workpiece and incremental amounts of travel ($\Delta U$, $\Delta V$) of the upper guide. Reference character INT denotes a pulse distribution circuit which performs a pulse distribution calculation on the basis of the incremental amounts of travel ($\Delta X$, $\Delta Y$) and ($\Delta U$, $\Delta V$) and creates distribution pulses Xp, Yp, Up, and Vp, DVX, DVY, DVU and DVV x-, y-, U- and V-axis servo control circuits, and MU, MV, MX and MY servo motors in the respective axes.

The vertical distance H between the wire supporting points, the distance h between the underside of the workpiece and the lower guide, and the tapering angle $\theta_0$ read out of the paper tape PTP are decoded by the decoder DEC and then applied to the correction circuit CPS. Upon reception of the distances H and h and the tapering angle $\theta_0$, the correction circuit CPS performs the corrective calculations of Eqs. (11) and (12) to obtain the distances Hc and hc, which are provided, as a correct vertical distance between the wire supporting points and a correct distance between the underside of the workpiece and the lower guide, to the parameter storage register PAR for storage therein. On the other hand, path data is stored in the register REG. The processing unit WPC effects known taper cutting control in accordance with the input path data and the corrected parameters, and calculates the incremental amounts of travel ($\Delta X$, $\Delta Y$) and ($\Delta U$, $\Delta V$), which are provided to the pulse distribution circuit INT. Upon inputting thereto of the incremental amounts of travel ($\Delta X$, $\Delta Y$) and ($\Delta U$, $\Delta V$), the pulse distribution circuit INT immediately executes the pulse distribution calculations for the four axes and applies the distribution pulses Xp, Yp, Up and Vp to the servo control circuits DVX, DVY, DVU and DVV, which drive the servo motors MU, MV, MX and MY in a known manner, thereby displacing the workpiece and the upper guide to perform desired taper cutting.

In the preferred embodiment of the present invention, letting the second deviation be represented by $\delta_2$, the tensile force of the wire electrode by T, the geometrical moment of inertia of the wire electrode by Iz, the Young modulus of the wire electrode by E, the aforementioned constant by $K^2$ (=T/IzE), the aforementioned radius of curvature by R, the tapering angle $\theta_0$, and a coefficient of correction by K, the second deviation is given as follows:

When the angle $\theta_0$ is smaller than the angle $\theta_0'$ which is dependent upon $\tan(\theta_0'/2) = 1/kR$, $$\delta_2 = K[\{\tan(\theta_0/2)/k\} - R\{1 - \cos(\theta_0/2)\}]/\sin\theta_0 \quad (13)$$

When the angle $\theta_0$ is greater than the angle $\theta_0'$, $$\delta_2 = K[(1/k^2R) - R\{1 - \cos(\theta_0'/2)\}]/\sin\theta_0 \quad (14)$$

In the above, k = T/IzE (where T is the tensile force of the wire, Iz the geometrical moment of inertia of the wire WR, and E the Young modulus of the wire WR). The angle $\theta_0'$ is the limit for the wire to be directed around the guide. This is obtainable by solving the following equation:

$$d^2y/dx^2 = -1/R \quad (15)$$

where y and x are the coordinates of the point of contact P in the directions perpendicular and horizontal to the line 4.

Figure 6:
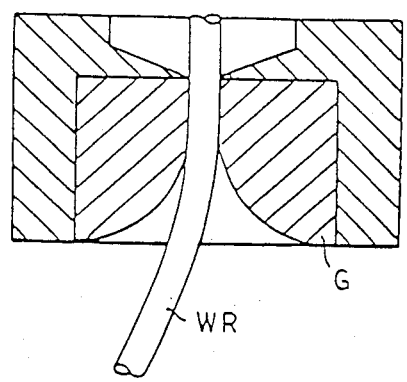
FIGS. 6 and 7 are sectional views of different kinds of guides.
Figure 7:
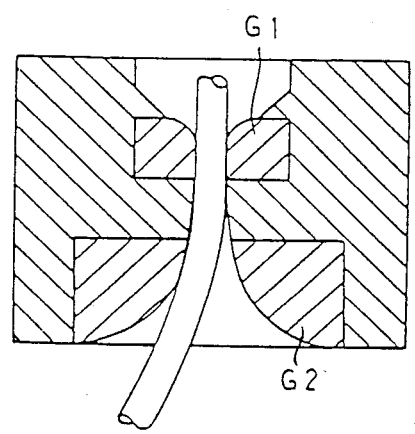
Figure 8:
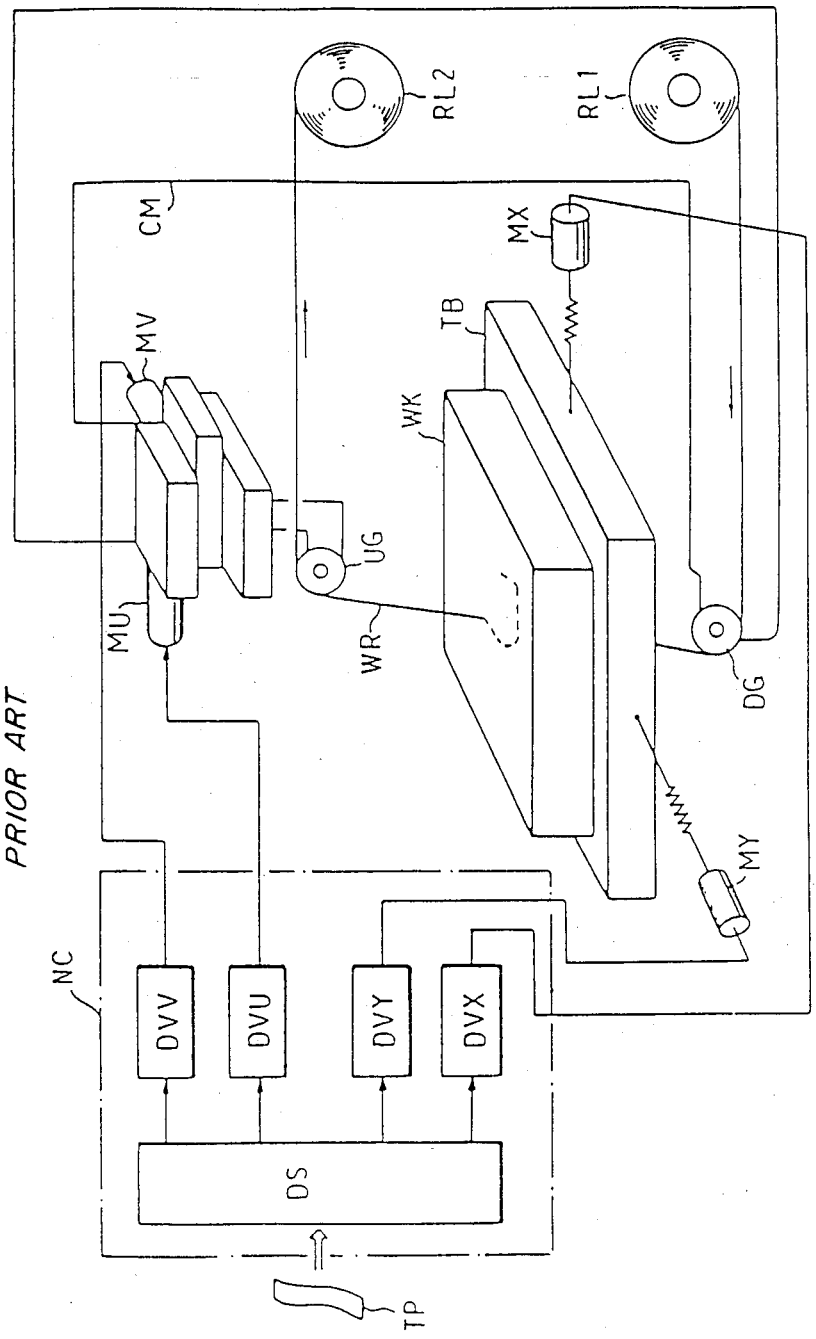
FIG. 8 is a diagram for explaining the general arrangement of a wire-cut, electric discharge machine.
Figure 9:
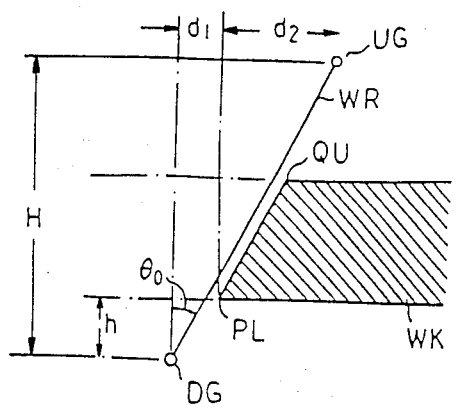
FIGS. 9 and 10 are diagrams for explaining taper cutting.
Figure 10:
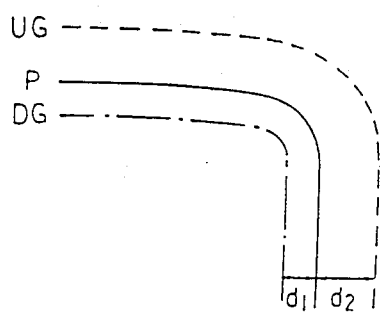
Figure 11:
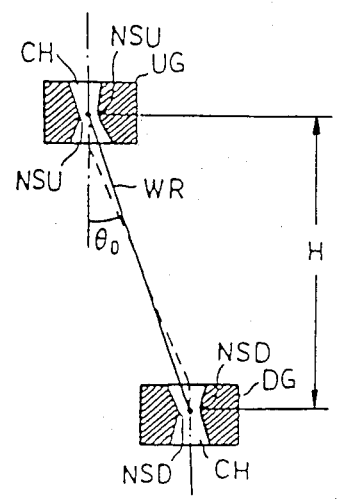
FIGS. 11 and 12 are diagrams explanatory of the prior art.
Figure 13:
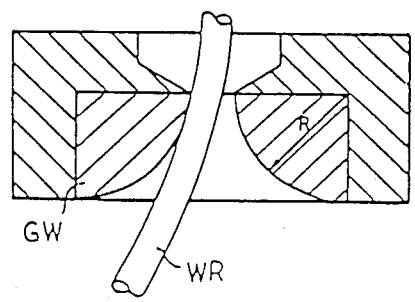
FIG. 13 is a sectional view showing a guide structure used in experiments.

The constant K is an experimental constant, which is used for compensating for calculation errors resulting from differences in the guide structure. That is, when the clearance between the guideway and the wire is relatively large, as shown in FIG. 13, even if K=1 in Eqs. (13) and (14), the deviation $\delta_2$ can be obtained with high accuracy. On the other hand, when the clearance between the wire WR and the guideway of the guide G is small, for instance, as depicted in FIG. 6, the bending of the wire is hindered there, resulting in the deviation becoming almost two-fold (i.e. K=2). With a guide employing a diamond die G1 of a small clearance and a saphire die G2 of a large clearance as shown in FIG. 7 (see Japanese U.M. Pub. Disc. Gazette No. 34923/84, for example), there are cases where the bending of the wire is hindered by the diamond die G1 and where the wire can be considered to merely make point contact with the diamond die G1 according to the value of its clearance. As a matter of fact, the value of the clearance is selected intermediate between those in the above two cases. Accordingly, it is desirable, in practice, to conduct a machining test for a certain tapering angle at least once and determine the correction coefficient K so that the deviation $\delta_2$ counted back from the tapering angle actually obtained by the test may agree with the aforementioned equation.

As described above, according to present invention, provision is made for electrically correcting, in accordance with the tapering angle, an error in the inclination angle of the wire which is based on the sum of a first deviation of the supporting point of the wire, which is attributable to the curved surface of the wire guide portion, and a second deviation of the wire supporting point which is caused by the fact that the wire does not exactly conform to the geometrical configuration of the wire guide portion owing to the elasticity of the wire. Thus the taper cutting accuracy can be further increased.

What is claimed is:

1. A taper cutting control unit for a wire-cut, electric discharge machine using a wire electrode, comprising:
    a pair of guides, between which the wire electrode is stretched, each having a curved wire electrode guide portion on the side where a workpiece is disposed, and the wire electrode is held at a taper angle to the workpiece and is displaced relative thereto for taper cutting of the workpiece; and correcting means for electrically correcting, in accordance with the taper angle, error in an inclination angle of the wire electrode which is based on the sum of a first deviation of a supporting point of the wire electrode in each guide, caused by the curved wire electrode guide portion of the guides, and a second deviation of the supporting point of the wire electrode caused by the wire electrode not exactly conforming to the geometry of the wire electrode guide portion of the guide due to the elasticity of the wire electrode.

2. A taper cutting control unit according to claim 1, wherein the second deviation obtainable with the correcting means is represented by $\delta_2$, a tensile force of the wire electrode by T, a geometrical moment of inertia of the wire electrode by Iz, a Young's modulus of the wire electrode by E, a constant $k^2(=T/IzE)$, a radius of curvature of the curved wire electrode guide portion of the guide by R, a tapering angle by $\theta_0$, and a coefficient of correction by K, and the second deviation, when the tapering angle $\theta_0$ is smaller than an angle $\theta_0'$ which is determined by $\tan(\theta_0'/2) = 1/kR$, is $\delta_2 = K[\{\tan(\theta_0/2)/k\} - R\{1-\cos(\theta_0/2)\}]/\sin\theta_0$ and, when the tapering angle $\theta_0$ is greater than the angle $\theta_0'$, is $\delta_2 = K[(1/k^2R) - R\{1-\cos(\theta_0'/2)\}]/\sin\theta_0.$

* * * * *